Patented May 9, 1933

1,908,059

UNITED STATES PATENT OFFICE

LESTER M. SAWIN, OF CHICAGO, ILLINOIS

PROCESS OF ROASTING NUTS

No Drawing.   Application filed November 8, 1929.   Serial No. 405,847.

The present invention relates to a new and improved process of roasting nuts, and is particularly adapted to the roasting of shelled nuts, such, for example, as peanuts, almonds, cashew nuts, Brazil nuts, and filberts.

Various general objects of the invention reside in the provision of a novel process by which nuts may be roasted quickly, uniformly, and to the desired degree, and which provides roasted nuts that are uniform in color, that have an unusually delicious sweet nutty flavor, and that retain these inherent qualities for an exceptionally long period of time.

The process involves roasting the nuts in a suitable edible oil, and preferably in a vegetable butter, such as cocoanut oil. The oil is heated to and maintained within a relatively high temperature range, and preferably the upper point of the range is in the neighborhood of 320° F. At this temperature, the nuts will roast quickly, thereby resulting in a saving in time and increased production.

The oil constitutes a bath, and as such may be kept in any suitable container and heated in any suitable manner. Preferably, the oil is kept in a flat shallow container or vat (not shown) heated on the bottom with a distributed gas fire. As a result, heat is added uniformly over a large area, thus resulting in a substantially uniform distribution of heat throughout the bath, and a sensitive and quickly responsive temperature control.

The nuts may be immersed in the heated oil bath by the use of any suitable means permitting quick removal at the desired time. In the present instance, flat shallow wire mesh baskets are used for this purpose, and the nuts are filled therein to a level such that they will just be covered with oil when immersed. Upon immersion, the nuts come into immediate and intimate contact with the oil, and are subjected substantially to a uniform temperature throughout each basket.

When nuts at room temperature are immersed in the heated bath, the temperature of the latter will fall. The extent of this fall is determined by the mass of the nuts immersed relative to the volume of oil in the bath. While the invention in its broadest aspect is not limited to specific proportions or amounts, I prefer a ratio by weight of one part of nuts to five parts of oil. Thus approximately fifty pounds of nuts would be roasted at one time in an oil bath of two hundred and fifty pounds. Preferably, this amount of nuts is handled in two separate baskets adapted to hold twenty-five pounds each.

The foregoing proportions are advantageous in that they permit a relatively easy temperature control, and make it possible to keep the temperature within the desired range, and to bring same up to the desired maximum during each roasting operation. In the present instance, upon immersing the nuts in the bath, the temperature will drop from 320° F. to from 270° F. to 280° F.

Recapitulating, in the preferred manner of carrying out the invention, fifty pounds of nuts, divided into two baskets, are immersed in a bath of cocoanut oil at that moment at approximately 320° F. Thereupon, the temperature of the bath drops to approximately 270° to 280° F. The temperature of the bath, however, will immediately begin to rise since heat is applied constantly. It is important that the nuts be allowed to roast in the bath the proper length of time. I have found that if the nuts are allowed to remain in the bath until the temperature of the latter again reaches 320° F. they will be roasted to the desired degree. At this temperature, the roasted nuts are quickly removed by lifting the baskets from the bath. The time ordinarily required is about seven minutes. It will be noted that the heat which is being added constantly to the bath during the roasting thus is removed with the roasted batch.

If the roasted nuts at the temperature at which they are removed from the bath were exposed to the air for any appreciable length of time, they would burn. Hence, the roasted nuts after removal from the heated bath are immediately reimmersed or redipped into a second bath of edible oil maintained at a temperature such that the nuts upon removal therefrom into contact with the air will not burn.

Preferably, the second bath consists of cocoanut oil, and in general is similar to the first bath except that it is not heated constantly from the gas fire, and is maintained at a lower temperature. In the present instance, the second bath is maintained at a temperature of approximately 270° F. Ordinarily, the heat carried over in the roasted nuts is sufficient to maintain the second bath at this temperature.

The nuts are allowed to remain in the second bath for a period of one or two minutes, and are then removed and allowed to cool. Immersion in the second bath serves to stop further cooking of the nuts, to prevent burning, and to reduce the temperature sufficiently to permit contact with air. After removal from the second bath, the nuts preferably are cooled by a blast of air.

By the foregoing process, nuts can be roasted quickly and uniformly. The roasted nuts have a uniform color, are buttery in all crevices and between halves, and have an unusually delicious flavor. These qualities are retained for an exceptionally long period of time. It will be understood that the invention in its broadest aspects is not limited to specific temperatures since these may be varied within reasonable limits without departing therefrom, and since different kinds of nuts might be roasted at somewhat different temperatures.

I claim as my invention:—

1. The process of roasting nuts which consists in immersing a batch of relatively cold nuts in a shallow bath of cocoanut oil at a temperature of approximately 320° F. and amounting in weight approximately to five times the quantity of nuts, then heating said bath back to said starting temperature, removing the nuts when said bath reaches said temperature, then immediately immersing the nuts for a brief period in a second shallow bath of cocoanut oil at a temperature of approximately 270° F., and then removing the nuts from said second bath.

2. The process of roasting nuts which consists in immersing a batch of relatively cold nuts in a relatively large bath of cocoanut oil at a temperature of approximately 320° F., then heating said bath back to said starting temperature, removing the nuts when said bath reaches said temperature, then immediately immersing the nuts for a brief period in a second bath of cocoanut oil at a temperature of approximately 270° F., and then removing the nuts from said second bath.

3. The process of roasting nuts which consists in immersing a batch of relatively cold nuts in a bath of edible oil at a temperature of approximately 320° F., then heating said bath back to said starting temperature, removing the nuts when said bath reaches said temperature, then immediately immersing the nuts in a second bath of edible oil at a temperature of approximately 270° F., and removing said nuts from said second bath.

4. The process of roasting nuts which consists in immersing a batch of relatively cold nuts in a relatively large bath of edible oil at a predetermined temperature sufficiently high to roast the nuts, then heating said bath back to said starting temperature, removing the nuts when said bath reaches said temperature, then immediately immersing the nuts for a brief period in a second bath of edible oil at a temperature substantially lower than said predetermined temperature.

5. The process of roasting nuts which consists in immersing a batch of relatively cold nuts in a bath of edible oil at a roasting temperature, removing the nuts when roasted, then immediately immersing the nuts for a brief period in a second bath of edible oil at a relatively low temperature.

6. The process of roasting nuts which consists in immersing the nuts in a heated bath of edible oil until roasted, and then immediately immersing the roasted nuts in a second bath of edible oil at a temperature lower than the first bath.

7. The process of roasting nuts which consists in immersing the nuts in a heated bath of edible oil at a roasting temperature up to approximately 320° F. until roasted, and then immediately immersing the roasted nuts in a second bath of edible oil at a nonroasting temperature which is lower than that of the first bath.

In testimony whereof, I have hereunto affixed my signature.

LESTER M. SAWIN.